(12) United States Patent
Naito

(10) Patent No.: US 6,618,072 B2
(45) Date of Patent: Sep. 9, 2003

(54) MOVING PICTURE CODING APPARATUS AND TV PHONE USING THE SAME

(75) Inventor: Yukihiro Naito, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/966,188

(22) Filed: Sep. 28, 2001

(65) Prior Publication Data

US 2002/0051490 A1 May 2, 2002

(30) Foreign Application Priority Data

Oct. 30, 2000 (JP) ........................................ 2000-330833

(51) Int. Cl.$^7$ ................................................. H04N 7/14
(52) U.S. Cl. ................................ 348/14.07; 348/14.13; 348/14.01
(58) Field of Search ............................. 348/14.01, 14.04, 348/14.05, 14.08, 14.09, 14.1, 14.11, 14.12, 14.14, 395.1; 375/240.18; 345/753; H04N 7/14

(56) References Cited

U.S. PATENT DOCUMENTS

| 5,448,285 A | 9/1995 | Kadowaki |
| 5,644,660 A | 7/1997 | Bruder |

FOREIGN PATENT DOCUMENTS

| EP | 0 989 563 | 3/2000 | | |
| JP | 7-320056 | 12/1995 | | |
| JP | 8-23528 | 1/1996 | | |
| JP | 408046792 A | * | 2/1996 | ............ H04N/1/41 |
| JP | 8-79721 | 3/1996 | | |
| JP | 8-205032 | 8/1996 | | |
| JP | 11-234639 | 8/1999 | | |
| JP | 11-341456 | 12/1999 | | |

OTHER PUBLICATIONS

"Line Transmission of Non–Telephone Signals Video Coding for Low Bitrate Communication," May 2, 1996, International Telecommunication Union, Draft Recommendation H.263, pp. 1–50, I.

* cited by examiner

*Primary Examiner*—Melur Ramakrishnaiah
(74) *Attorney, Agent, or Firm*—Dickstein, Shapiro, Morin & Oshinsky, LLP.

(57) ABSTRACT

To provide a moving picture coding apparatus and TV phone wherein a handwritten image is coded with less quantity of calculation and less power consumption. The moving picture signal from camera is combined with handwritten image signal from pen input by combining circuit. Then, combined image as well as coding region information to discriminate a region to be coded is fed to motion compensative moving picture coding circuit. Motion compensative moving picture coding circuit deems that the region needless to be coded is the same as the latest frame. According to the present invention, a quantity of calculation and power consumption of moving picture coding apparatus and TV phone using the same can be reduced, by coding only the newly inputted handwritten image. Degradation of image quality can be reduced by putting its motion vector "0".

12 Claims, 5 Drawing Sheets

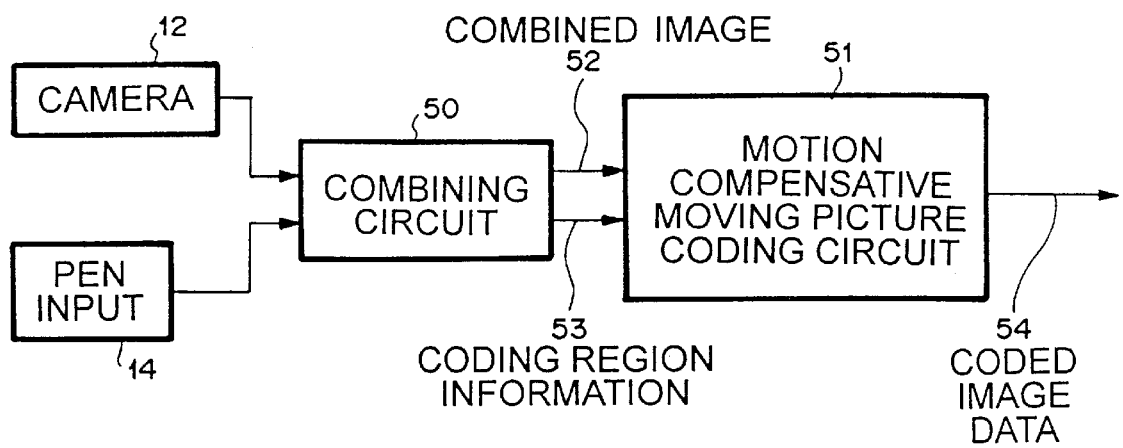
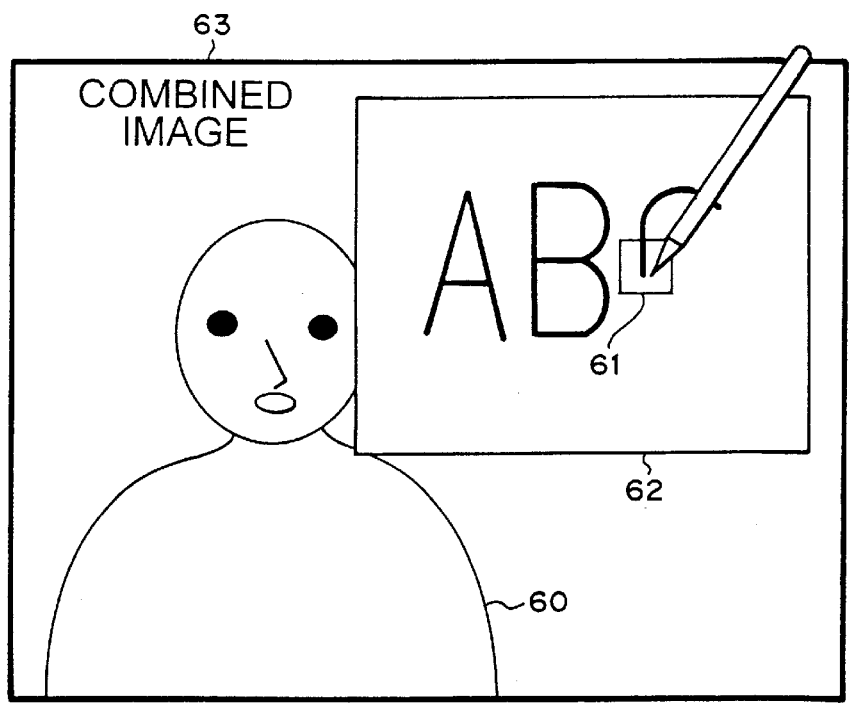

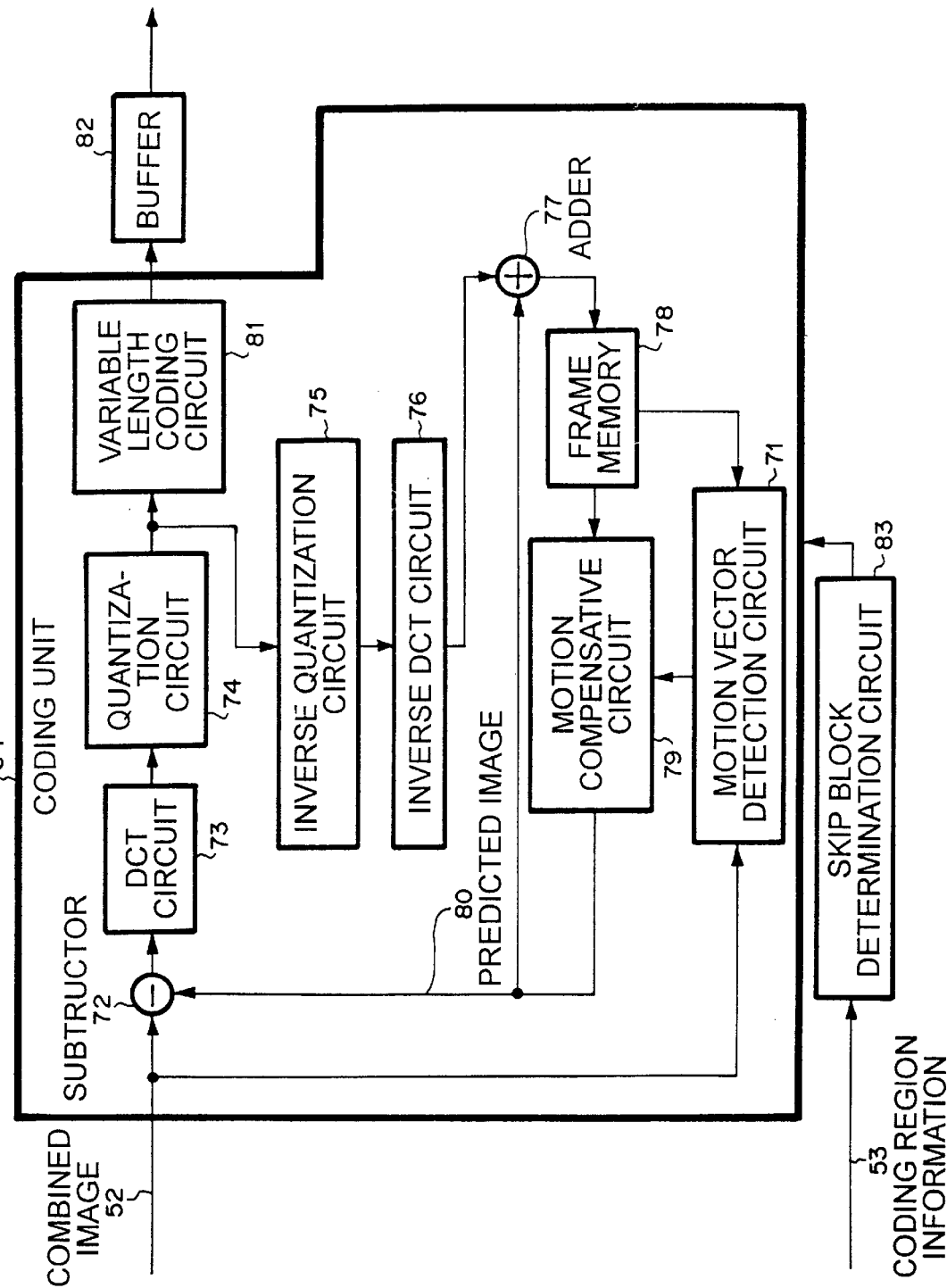

MOVING PICTURE CODING APPARATUS AND TV PHONE USING THE SAME

BACKGROUND OF THE INVENTION

1. Technical Field of the Invention

The present invention relates to a moving picture coding apparatus and a TV phone using the same.

2. Description of the Prior Art

Handwritten images are often transmitted in TV conferences and TV telephones. FIG. 5 is a block diagram of a transmitting system of a TV phone with an input for handwritten images, while FIG. 6 is a block diagram of receiving system of a TV phone with an output for handwritten images.

Voice signals from microphone 10, moving pictures from camera 12 and handwritten images pen input 14 are coded by voice coding circuit 11, moving picture coding circuit 13 and data coding circuit, respectively. These coded data are multiplexed by multiplexer 16 which is connected with a transmission channel.

The multiplexed data is demultiplexed by demultiplexer 17. Then, the voice signals are decoded by voice decoding circuit 18 and outputted to speaker 19, the moving pictures are decoded by moving picture decoding circuit 20 and outputted to moving picture monitor 21, and the handwritten data are decoded by data decoding circuit 22 and outputted to handwritten image monitor 23.

Both the transmitting and receiving system in the TV phone should share a data transmission protocol.

A moving picture signal may be combined with a handwritten image signal and decoded by moving picture coding means, as disclosed in JP 11-234639 A (1999). FIG. 7 is a block diagram of a transmitting system of a TV phone. A moving picture from camera 12 and a handwritten image from pen input 14 are combined by combining circuit 31 into a combined image 33 which is coded by moving picture coding circuit 32.

FIG. 8 is an example of image 42 by combining a moving picture 40 with a handwritten image 41 of which image size is adjusted.

However, it requires unnecessarily much calculations and electric power to code, by conventional method of coding moving pictures, the handwritten image almost all of which regions are still.

SUMMARY OF THE INVENTION

An object of the present invention is to code the handwritten image with less quantity of calculations and less electric power consumption in moving picture coding apparatus and TV phone using the same.

The moving picture coding apparatus of the present invention comprises a combining circuit for combining a moving picture with a handwritten image, a motion compensative moving picture coding circuit for coding all the moving picture and a newly added part in the handwritten image.

The motion compensative moving picture coding circuit codes only the newly inputted region, on the basis of information concerning a region already coded and a region newly inputted. According to the present invention, a quantity of calculation and power consumption of moving picture coding apparatus and TV phone using the same can be reduced, by coding only the newly inputted handwritten image.

Degradation of image quality can be further reduced by putting its motion vector "0".

BRIEF EXPLANATION OF THE DRAWINGS

FIG. 1 is a block diagram of the moving picture coding apparatus of the present invention.

FIG. 2 is an illustration of coding region information in a combined image outputted from combining circuit 50 as shown in FIG. 1.

FIG. 3 is a block diagram of motion compensative moving picture coding apparatus 51 as shown in FIG. 1.

PREFERRED EMBODIMENT OF THE INVENTION

Figure 4:
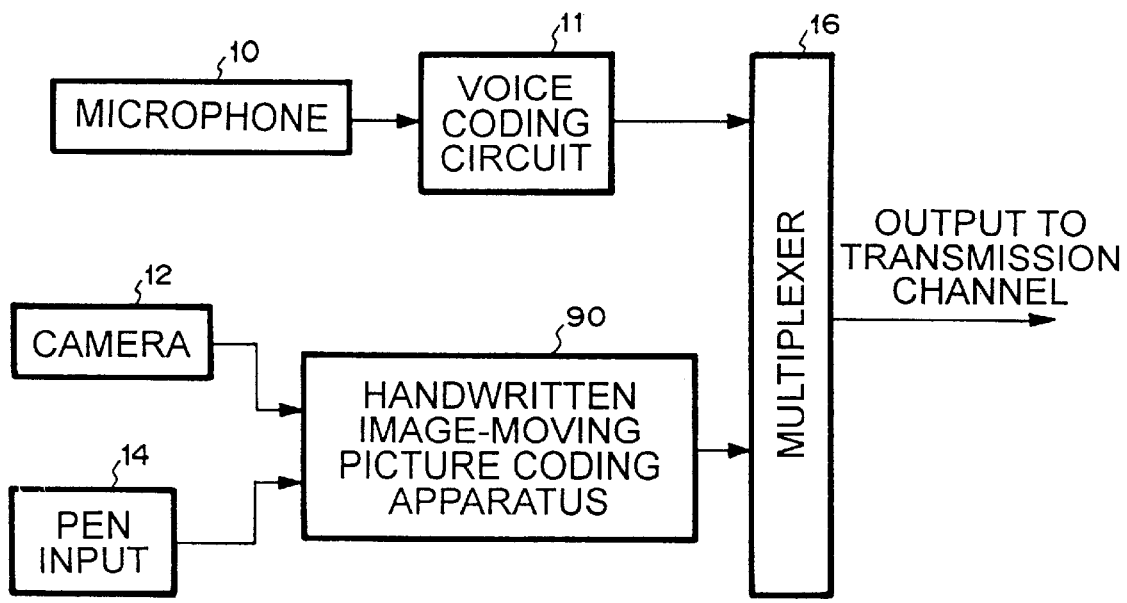
FIG. 4 is a block diagram of the TV phone of the present invention.
Figure 5:
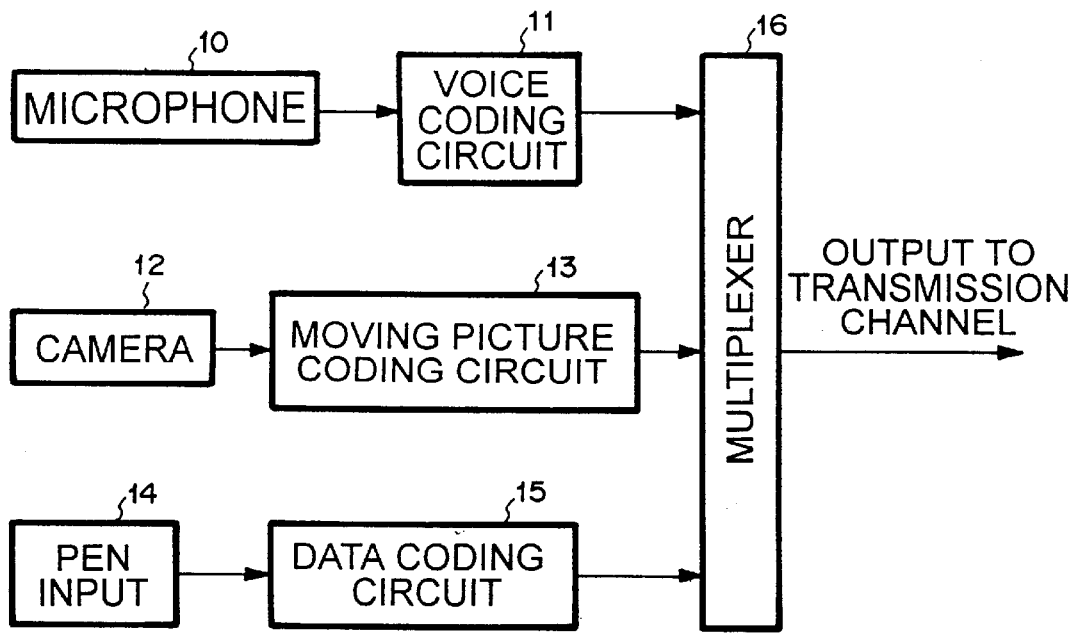
FIG. 5 is a block diagram of a transmitter of a conventional TV phone.
Figure 6:
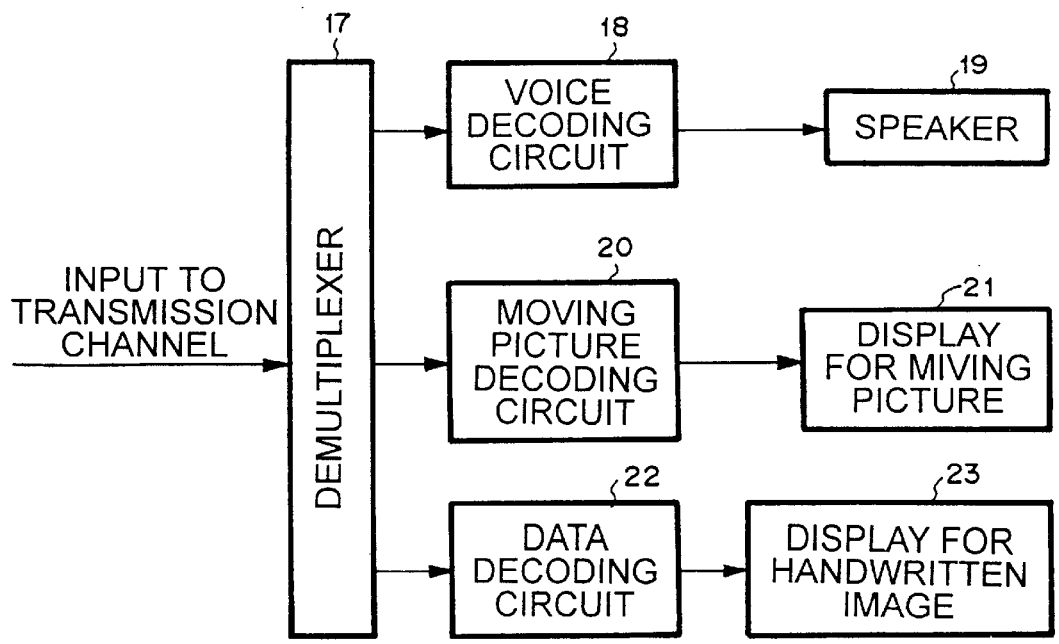
FIG. 6 is a block diagram of a receiver of a conventional TV phone.
Figure 7:
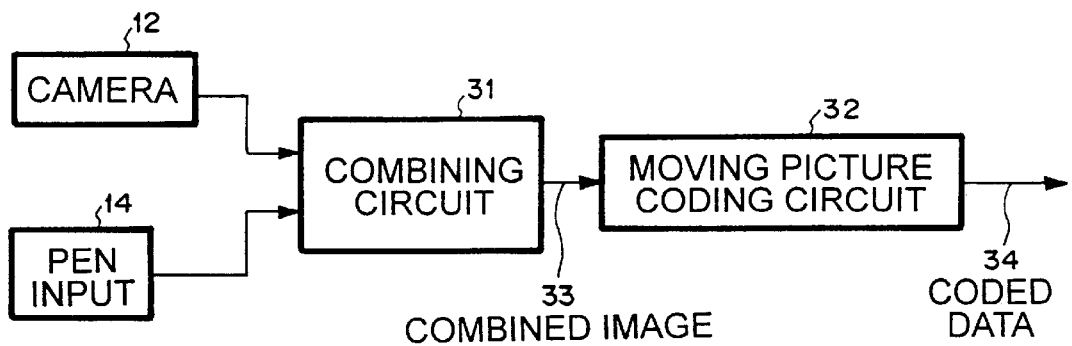
FIG. 7 is a transmitter of a conventional TV phone capable of transmitting handwritten image.
Figure 8:
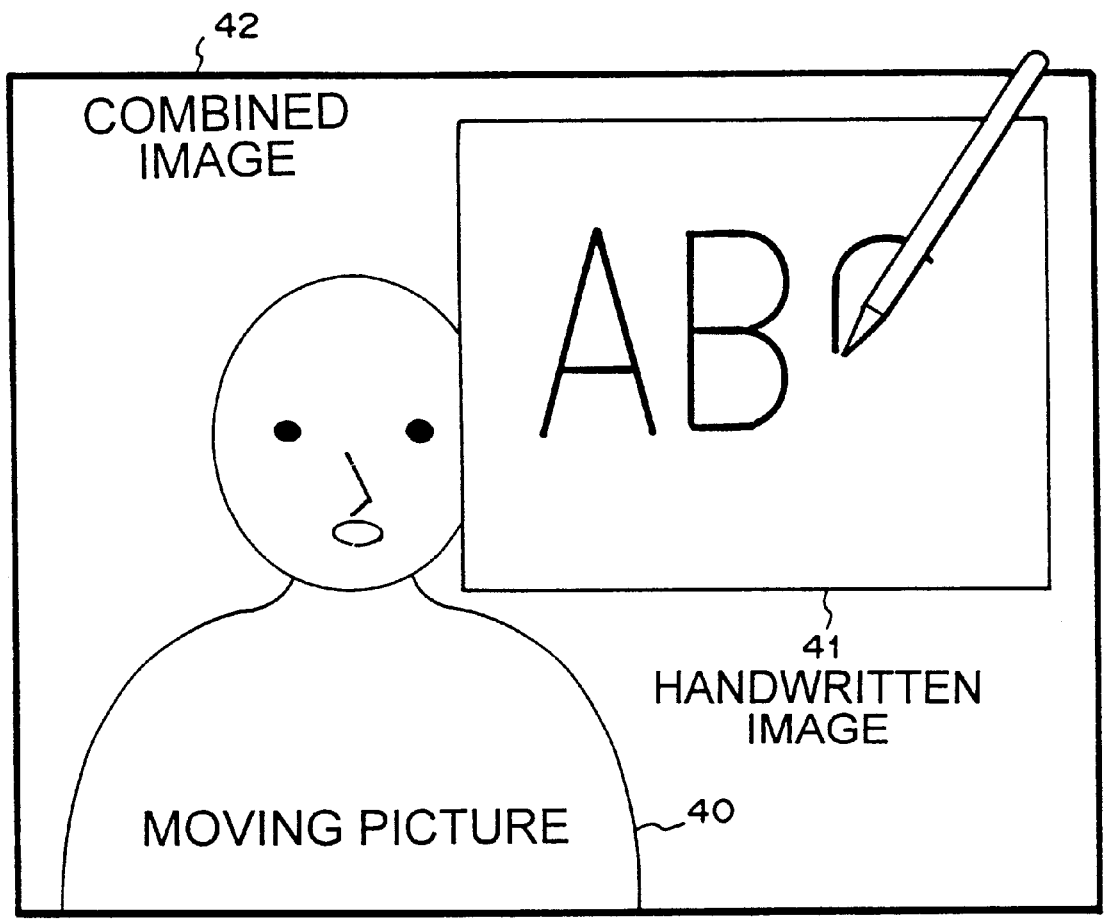
FIG. 8 is an illustration of a combined image outputted from combining circuit 31 as shown in FIG. 7.

The embodiment of the present invention is explained, referring to the drawings. FIG. 1 is a block diagram of the moving picture coding apparatus of the present invention. The moving picture signal from camera 12 is combined, by combining circuit 50, with handwritten image signal from pen input 14. Then, combined image 52 as well as coding region information 53 for indicating a region to be coded is fed to motion compensative moving picture coding circuit 51.

Motion compensation moving picture coding circuit 51 determines whether the region to be coded is the same as the latest frame.

FIG. 2 is an illustration for explaining coding region information 53. Moving picture includes coding region 60 and non-coding region 62 which is already coded.

Further, non-coding region 62 of the handwritten image includes coding region 61 which is newly written during one frame.

FIG. 3 is a block diagram of motion compensative moving picture coding circuit 51. Combined image 52 is divided into, for example, blocks of 16×16 pixels, each of which is coded on the basis of coding region information 53 and the coded results are stored in buffer 82.

Skip block determination circuit 83 determines whether each block in combined image 52 is a skip block which is not to be coded. When a block is not a skip block, the block is coded by coding unit 84.

Moving vector detection unit 71 calculates a motion vector, by comparing combined image 52 with the latest frame in frame memory 78. Then, movement compensation circuit 79 generates predicted image 80 on the basis of the motion vector. Then, subtractor 72 calculates a difference between combined image and predicted image 80. The difference is processed by DCT circuit 73, quantization circuit 74 and variable length coding circuit 81, successively, and finally the output from variable length coding circuit 81 is stored into buffer 82. Further, the output from quantization circuit 74 is processed by inverse quantization circuit 75, inverse DCT circuit 76 and adder 77, succesively, and finally the output from adder is stored into frame memory 78.

On the other hand, when a skip block is found by skip block determination circuit 83, coding unit 84 copies in frame memory 78 the corresponding block in the latest frame. Therefore, any other circuits in coding unit 84 except frame memory 78 does not consume electric power.

FIG. 4 is a block diagram of a transmitter of TV phone using the above-explained motion compensative moving picture coding circuit. Voice signal from microphone 10 is coded by voice coding circuit 11, while moving picture from camera 12 and handwritten image from pen input 14 are coded by moving picture coding circuit 90 including combining circuit 50 and motion compensative moving picture coding circuit 51. The output from voice coding circuit 11 and moving picture coding circuit 90 are multiplexed by multiplexer 16.

Here, when skip block determination circuit 83 determines a block to be a non-coding region, that block may not be deemed to be the skip block, but may be deemed to be a block of motion vector "0".

In this case, motion vector detection circuit 71 outputs a motion vector "0" and, afterward, other circuits in coding unit 84 work as usual.

Thus, coding unit 84 consumes less electric power, because motion vector detection circuit 71 consumes less power than usual.

In a second embodiment coding region information 53 may be one of threefold such as moving picture region, handwritten region without movement and handwritten region with movement. The moving picture region is coded conventionally, the handwritten region without movement is processed as a skip block, and the handwritten region with movement is processed as a region of motion vector "0". In this case, the power consumption becomes less than in the case of the first embodiment. Further, degradation of image quality due to a spurious motion vector can be prevented.

In a third embodiment, coding region information 53 may be one of twofold such as moving picture region and handwritten region. The moving picture region is coded conventionally and the handwritten region is processed as a region of motion vector "0". In this case, combining circuit 50 is simplified. Further, motion vector detection circuit 71 consumes less electric power, as the second embodiment. Further, degradation of image quality due to a spurious motion vector can be prevented in the third embodiment.

What is claimed is:

1. A moving picture coding apparatus which comprises:
   a combining circuit for combining a moving picture and a handwritten image and for outputting a combined image; and
   a motion compensative moving picture coding circuit for coding said moving picture and a newly added part of said handwritten image, wherein
   said combining circuit outputs, toward said motion compensative coding circuit, coding region information which indicates that a region coded before a latest frame of said handwritten image is a non-coding region and that said moving picture is a coding region; and
   said motion compensative moving picture coding circuit codes said combined image on the basis of said coding region information.

2. The moving picture coding apparatus according to claim 1, wherein said coding region information identifies a region which is to be coded in said combined image and a region which is not to be coded due to an absence of difference from said latest frame and a previous frame.

3. The moving picture coding apparatus according to claim 1, wherein said coding region information identifies a region of said moving picture, a region which is to be coded in said handwritten image and a region which is not to be coded in said handwritten image.

4. The moving picture coding apparatus according to claim 1, wherein said coding region information identifies a region of said moving picture and a region of said handwritten image.

5. The moving picture coding apparatus according to claim 1, wherein said motion compensative moving picture coding circuit comprises a skip block determination circuit and a coding circuit, wherein said skip block determination circuit instructs said coding circuit to use said latest frame as data for said non-coding region.

6. The moving picture coding apparatus according to claim 1, wherein said motion compensative moving picture coding circuit comprises a skip block determination circuit and a coding circuit, wherein said skip block determination circuit instructs said coding circuit to code said non-coding region as a region with a motion vector of "0".

7. A TV phone which comprises:
   a voice input for receiving voice data;
   a voice coder for coding said voice data;
   a moving picture input for receiving moving picture data;
   a pen input for receiving handwritten image data;
   a moving picture coding apparatus which comprises:
      a combining circuit for combining said moving picture data and said handwritten image data and for outputting a combined image; and
      a motion compensative moving picture coding circuit for coding said moving picture data and a newly added part of said handwritten image data; and
   a multiplexer for multiplexing said coding voice data output from said voice coder and an output from said moving picture coding apparatus, wherein
   said combining circuit outputs, toward said motion compensative moving picture coding circuit, coding region information which indicates that a region coded before a latest frame of said handwritten image is a non-coding region and that said moving picture is a coding region; and
   said motion compensative moving picture coding circuit codes said combined image on the basis of said coding region information.

8. The TV phone according to claim 7, wherein said coding region information identifies a region which is to be coded in said combined image and a region which is not to be coded due to an absence of difference from said latest frame and a previous frame.

9. The TV phone according to claim 7, wherein said coding region information identifies a region of said moving picture, a region which is to be coded in said handwritten image and a region which is not to be coded in said handwritten image.

10. The TV phone according to claim 7, wherein said coding region information identifies a region of said moving picture and a region of said handwritten image.

11. The TV phone according to claim 7, wherein said motion compensative moving picture coding circuit comprises a skip block determination circuit and a coding circuit, wherein said skip block determination circuit instructs said coding circuit to use said latest frame as data for said non-coding region.

12. The TV phone according to claim 7, wherein said motion compensative moving picture coding circuit comprises a skip block determination circuit and a coding circuit, wherein said skip block determination circuit instructs said coding circuit to code said non-coding region as a region with a motion vector of "0".

* * * * *